US 11,408,538 B2

(12) United States Patent
Taillon

(10) Patent No.: US 11,408,538 B2
(45) Date of Patent: Aug. 9, 2022

(54) SUPPORT ASSEMBLY FOR SWIVELLABLY SUPPORTING HYDRAULIC LINES

(71) Applicant: TAIMI R&D INC., Saint-Prime (CA)

(72) Inventor: Michel Taillon, Saint-Prime (CA)

(73) Assignee: TAIMI R&D INC., Saint-Prime (CA)

( * ) Notice: Subject to any disclaimer, the term of this patent is extended or adjusted under 35 U.S.C. 154(b) by 246 days.

(21) Appl. No.: 16/500,744

(22) PCT Filed: Apr. 4, 2018

(86) PCT No.: PCT/CA2018/050412
§ 371 (c)(1),
(2) Date: Oct. 3, 2019

(87) PCT Pub. No.: WO2018/184105
PCT Pub. Date: Oct. 11, 2018

(65) Prior Publication Data
US 2021/0285571 A1    Sep. 16, 2021

Related U.S. Application Data

(60) Provisional application No. 62/481,304, filed on Apr. 4, 2017.

(51) Int. Cl.
*F16L 3/16* (2006.01)
*F16L 3/12* (2006.01)
*F16L 3/22* (2006.01)

(52) U.S. Cl.
CPC .............. *F16L 3/16* (2013.01); *F16L 3/1222* (2013.01); *F16L 3/221* (2013.01)

(58) Field of Classification Search
CPC . F16L 3/16; F16L 3/1222; F16L 3/221; F16L 3/223; F16L 3/015; F16L 3/2235
See application file for complete search history.

(56) References Cited

U.S. PATENT DOCUMENTS 2,179,406 A * 11/1939 Fitzpatrick .............. F16L 3/221
248/68.1
3,695,563 A * 10/1972 Evans ..................... F16L 3/227
248/56
(Continued)

FOREIGN PATENT DOCUMENTS

CN         101479517 A       7/2009
CN         102966794 A  *    3/2013
(Continued)

OTHER PUBLICATIONS

International Search Report and Written Opinion dated Jun. 26, 2018 for International Application No. PCT/CA2018/050412.
(Continued)

*Primary Examiner* — Terrell L McKinnon
*Assistant Examiner* — Ding Y Tan
(74) *Attorney, Agent, or Firm* — Christopher R. Carroll; The Small Patent Law Group LLC

(57) ABSTRACT

A support assembly for hydraulic lines is disclosed. The support assembly includes a frame designed to retain at least one ring within its opening. Each ring is configured to be secured about a single hydraulic hose, thus simultaneously securing it within the frame. Each ring can rotate with respect to the frame about their longitudinal axis, reducing the stress exerted directly on the hydraulic line. The support assembly further includes a second frame in which the frame is attached. The frame can rotate about an axis that is perpendicular to the rotation of the rings to further lessen the stress on the hydraulic lines. The support assembly is attached to a hydraulically operated machine by a base plate or bracket onto which the second frame is fixedly attached.

17 Claims, 14 Drawing Sheets

(56) References Cited

U.S. PATENT DOCUMENTS

| | | | | |
|---|---|---|---|---|
| 4,245,694 | A | * | 1/1981 | Smith .................... F28F 9/0138 165/82 |
| 5,128,841 | A | | 7/1992 | Maglica et al. |
| 6,248,953 | B1 | * | 6/2001 | Miller .................... H02G 15/013 174/74 R |
| 6,378,813 | B1 | * | 4/2002 | Gretz ........................ F16L 3/04 248/68.1 |
| 7,938,451 | B2 | * | 5/2011 | Taillon .................... F16L 39/04 285/121.3 |
| 2002/0012582 | A1 | * | 1/2002 | Kirkegaard .............. H02G 7/00 415/4.3 |
| 2003/0183413 | A1 | | 10/2003 | Kato |
| 2008/0012307 | A1 | | 1/2008 | Taillon |
| 2013/0257095 | A1 | * | 10/2013 | Kurauchi .............. E02F 9/0891 296/187.01 |
| 2015/0222106 | A1 | * | 8/2015 | Caspari ..................... F16L 3/08 174/651 |
| 2018/0264630 | A1 | * | 9/2018 | Short ........................ F16L 3/18 |

FOREIGN PATENT DOCUMENTS

| | | | | |
|---|---|---|---|---|
| CN | 102966794 | A | | 3/2013 |
| DE | 4234313 | A1 | * | 4/1994 .............. F16L 3/237 |
| DE | 4234313 | A1 | | 4/1994 |
| DE | 102014016869 | A1 | * | 5/2016 ............. F03D 80/85 |
| KR | 101740467 | B1 | | 5/2017 |
| WO | WO-2008105115 | A1 | * | 9/2008 .............. E02F 3/325 |
| WO | WO-2012010221 | A1 | * | 1/2012 ........... B62K 15/008 |

OTHER PUBLICATIONS

Search Report for corresponding CN application No. 201880035552.2 dated Dec. 14, 2020.

The English Summary of the First Office Action for corresponding CN application No. 201880035552.2 dated Dec. 14, 2020.

Extended European Search Report for corresponding EP application No. 18780615.3 dated Dec. 18, 2020.

Office Action for corresponding RU application No. 2019131140/12 dated May 13, 2021.

The English translation of the Office Action for corresponding RU application No. 2019131140/12 dated May 13, 2021.

Search Report for corresponding RU application No. 2019131140/12 dated May 13, 2021.

The English translation of the Search Report for corresponding RU application No. 2019131140/12 dated May 13, 2021.

* cited by examiner

SUPPORT ASSEMBLY FOR SWIVELLABLY SUPPORTING HYDRAULIC LINES

TECHNICAL FIELD

The technical field generally relates to hose joints and supports for use with mechanical equipment that employ hydraulic lines, and more specifically relates to a support assembly for swivelably supporting one or more hydraulic lines, and further relates to a kit for assembling such a support assembly.

BACKGROUND

Hydraulically operated machinery often comprises multiple hydraulic lines which run along the length of the machine and provide hydraulics to various components. Such machines regularly have moving parts and components requiring long hydraulic lines that can run over a notable portion of the machine. For example, machinery used in the forestry industry often has movable arms to effectively manoeuvre in dense forest areas, and this type of machinery often has longer hydraulic lines to follow the movements of the mobile components of the machine. Consequently, hydraulic lines often are longer than the length of the machine and need to be secured to the machine to avoid damaging the lines.

Hydraulic lines are often grouped together and secured to machines using rigid hose joints such as "bulkheads", unions, manifolds, and the like. Manufacturers endeavour to improve these installations by offering systems that attempt to allow safe movement and long lifespans for the hydraulic lines. However, these rigid joints reduce flexibility of each individual line and therefore reduce flexibility of the group.

In some cases, clamps, chains or straps are used to support the group of hydraulic lines at precise locations. These systems have drawbacks that can be due to the uneven weight distribution, the vibrations of the machine and/or the requirement of lubricative fluids. Over time, the hydraulic lines can become dislodged or can slide, which can lead to a cascade of problems.

There exists in the forestry and mining industries hydraulic swivels to join hydraulic lines. While these systems can help reduce torsion effects exerted on the hydraulic lines during operation of the equipment, they can also have other drawbacks, such as creating pressure drop within the lines, which is related to the swivels' being rigid joints restricting the free passage of fluid through the hydraulic lines.

There is therefore a need for a hydraulic line support to overcome at least some of the shortcomings of existing systems.

SUMMARY

According to an aspect, there is provided a support assembly for swivelably supporting a hydraulic line. The support assembly comprising: a ring having an inner surface and an outer surface, the ring comprising a pair of complementary components that are securable together about a hydraulic line such that the inner surface contacts and secures the hydraulic line with respect to the ring; and a frame defining an opening and having cooperative surfaces that face toward the opening, the cooperative surfaces of the frame being configured to contact and cooperate with the outer surface of the ring to: retain the ring within the opening and secured in an axial direction; and permit rotation of the ring about the axial direction in response to torsional forces exerted on the hydraulic line.

According to one possible embodiment, the complementary components are removably connectable to one another and comprise at least one connection aperture configured to align with the at least one connection aperture of the other of the pair of complementary components when the pair of complementary components is aligned to form the ring; and the ring further comprises a connection member configured to extend through the aligned connection apertures and secure the pair of complementary components together.

According to another possible embodiment, the connection member comprises a bolt insertable through the aligned connection apertures and a nut to secure the bolt with respect to the pair of complementary components.

According to a possible embodiment, the connection apertures are threaded and the connection member comprises a bolt insertable through the aligned connection apertures to secure the pair of complementary components together.

According to a possible embodiment, the inner surface of the ring comprises at least two protrusions extending inwardly and contacting the hydraulic line. The protrusions are spaced apart along the axial direction and define therebetween a central portion of the inner surface. The central portion of the inner surface is concave such that a central section of the hydraulic line is substantially free of contact with the ring when the ring is secured about the hydraulic line.

According to a possible embodiment, the protrusions are spaced apart and sized such that when the pair of complementary components are secured together about the hydraulic line, the central section of the hydraulic line bulges outwardly, blocking movement along the axial direction of the hydraulic line between the protrusions.

According to possible embodiments, the inner surface of the ring comprises opposite two projections located at respective opposite ends of the inner surface, the projections contacting the hydraulic line. Each protrusion and each projection is configured to radially extend around a periphery of the hydraulic line. The opposite ends of the inner surface are tapered outwardly such that when the pair of complementary components are secured together about the hydraulic line, each extremity of said hydraulic line is flared.

According to a possible embodiment, the inner surface of the ring comprises at least one recess, the at least one recess extending between respective opposite ends of the inner surface and defines a space between the inner surface and the hydraulic line to avoid pinching of the hydraulic line and wherein each protrusion and each projection is broken up by the at least one recess.

According to a possible embodiment, each projection is spaced apart from the at least two protrusions, defining therebetween respective secondary concave regions in which the hydraulic line is free of contact with the ring when the ring is secured about the hydraulic line.

According to a possible embodiment, the outer surface of the ring comprises a concave region and the cooperative surfaces of the frame comprise a convex region that fits within the concave region to cooperate therewith. The concave region of the outer surface of the ring and the convex region of the cooperative surfaces are arranged such that a play exists therebetween facilitating the rotation of the ring about the axial direction. The concave region of the outer surface of the ring can be a U-shaped depression and the frame can comprise a plurality of tubes to cooperate with the U-shaped depression of the rings.

According to possible embodiments, the frame comprises a bottom member, two side members extending upwardly from the bottom member, a top member and fasteners for fastening the side members to the top member. The fasteners include nuts and the top member is removably attachable to the side members by the nuts, allowing access to the opening for insertion of the ring therein. Each side member comprises a threaded end and the top member comprises opposed ends, the opposed ends of the top member being provided with apertures to receive the threaded ends of corresponding side members and the top member being secured thereon with corresponding nuts.

According to another possible embodiment, the support assembly comprises a plurality of the rings, each securing a corresponding hydraulic line, and wherein the cooperative surfaces of the frame are configured to contact and cooperate with the outer surfaces of the rings to: retain the plurality of rings within the opening and secured in an axial direction; and permit rotation of the plurality of rings about the axial direction in response to torsional forces exerted on the corresponding hydraulic lines.

According to a possible embodiment, at least a first set of rings is positioned vertically within the opening and define a vertical stack of rings. The outer surface of the rings comprises seats on opposed ends of the concave region, the seats being configured to provide contact between adjacent rings.

According to a possible embodiment, the frame comprises a middle member extending upwardly from the bottom member between the two side members, the middle member being provided with cooperative surfaces to cooperate with the outer surface of the plurality of rings. The middle member is positioned to define two side-by-side openings and allow two vertical stacks of rings to be inserted into the respective openings, the two vertical stacks of rings being separated by the middle member. Each vertical stack of rings comprises a bottommost ring, an uppermost ring and at least one middle ring located between the bottommost and uppermost rings; and wherein the concave region of the outer surface of the bottommost ring cooperates with the convex region of the bottom member of the frame and the convex region of at least one of the side members and middle member, the concave region of the outer surface of the uppermost ring cooperates with the convex region of the top member of the frame and the convex region of at least one of the side members and middle member, and the concave region of the outer surface of the at least one middle ring cooperates with the convex region of at least one of the side members and middle member.

According to a possible embodiment, the side members of the frame extend upwardly from the bottom member and away from each other so that the opening of the frame is able to receive rings with different radiuses.

According to a possible embodiment, the support assembly further comprises a second frame defining an open space and comprising a coupling member to: connect the frame to the second frame within the open space; and allow rotation of the frame about the coupling member, the rotation of the frame being perpendicular to the rotation of the rings.

According to a possible embodiment, the coupling member is one of the at least one middle member of the frame. The top member of the frame is provided with a central aperture designed to receive the coupling member, securing the top member within the open space of the second frame.

According to another possible embodiment, the support assembly comprises a base plate fixedly connectable to the second frame and configured for connection to a hydraulically operated machine.

According to another aspect, there is provided a kit for assembling a support assembly for swivelably supporting a hydraulic line. The kit comprising a ring having an inner surface and an outer surface, the ring comprising a pair of complementary components that are securable together about a hydraulic line such that the inner surface contacts and secures the hydraulic line with respect to the ring. The kit further comprising a frame defining an opening and having cooperative surfaces that face toward the opening, the cooperative surfaces of the frame being configured to contact and cooperate with the outer surface of the ring to retain the ring within the opening and secured in an axial direction and permit rotation of the ring about the axial direction in response to torsional forces exerted on the hydraulic line.

According to a possible embodiment, the kit comprises one or more features described above.

According to yet another aspect, a support assembly for swivelably supporting a group of hydraulic lines is provided. The support assembly comprising a plurality of rings fixedly mountable around respective hydraulic lines, each ring having external surfaces; and a frame defining an opening to receive the rings and having inner surfaces configured to cooperate with the external surfaces of the rings when the rings are mounted within the opening, to allow rotation of the rings about respective longitudinal axes in response to torsional forces exerted on the hydraulic lines while retaining the rings within the opening.

According to a possible embodiment, the rings are mountable within the opening of the frame so that, when each ring is in a static position, a cooperative portion of the external surfaces is in contact with corresponding cooperative portion of the internal surfaces of the frame and an abutment portion of the external surfaces is in contact with at least one adjacent ring.

According to possible embodiments, the rings are positioned in the opening as a column of pairs of the rings. The column being separated by a middle member dividing the opening into two adjacent openings, the middle member having inner surfaces for cooperating with the external surfaces of the rings.

According to another possible embodiment, the frame is configured so that the opening has different widths for accommodating rings of different external diameters therein. Preferably, the frame has a bottom width sized for receiving a first ring having a smallest external diameter, a middle width sized for receiving a second ring having a medium external diameter, and an upper width sized for receiving a third ring having a largest diameter.

According to a possible embodiment, the external surfaces of each ring includes a concave region and the corresponding inner surfaces of the frame comprise a convex region for cooperating therewith. Preferably, the convex region and the concave region have generally smooth curvatures.

According to a possible embodiment, the external surfaces of each ring includes a convex region and the corresponding inner surfaces of the frame comprise a concave region for cooperating therewith. Preferably, the convex region and the concave region have generally smooth curvatures.

According to possible embodiments, the support assembly further comprises a second frame. The frame being rotatably attached to the second frame such that the frame can rotate about a secondary axis that is different from the longitudinal axis about which the rings rotate. Preferably, the secondary axis is perpendicular to the longitudinal axis about which the rings rotate and the second frame is configured to be fixedly mounted to a part of a hydraulic machine.

According to a possible embodiment, the frame is configured to have an open configuration for insertion of the rings and a closed configuration in which the rings are retained, the open configuration allowing the rings to be inserted laterally to engage the inner surfaces of the frame. Preferably, the frame comprises a removable member such that, in the open configuration, the frame has a general U-shape.

According to a possible embodiment, each ring comprises a pair of complementary components that are removably connected together about a corresponding hydraulic line.

According to possible embodiments, the support assembly comprises one or more features mentioned above.

According to a final aspect, there is provided a support assembly for swivelably supporting hydraulic lines. The support assembly comprising, a plurality of first elements fixedly mountable with respect to respective hydraulic lines, each first element having external surfaces; a second element mounted the first elements and permitting rotation of each first element about an axis of each first element that is aligned with a longitudinal axis of the corresponding hydraulic line in response to torsional forces exerted on the hydraulic lines, while retaining the first elements and preventing substantial movement is directions other than the rotation; and a third element mounted to the second element and permitting rotation of the second element about a secondary axis different from the axis about which the first element rotates.

According to possible embodiments, the first elements comprise rings, the second element comprises a frame, and the third element comprises a second frame. Preferably, the support assembly comprises one or more features mentioned above.

DETAILED DESCRIPTION

As will be explained below in relation to various embodiments, a support assembly is described for swivelably supporting one or more hydraulic lines on a hydraulically operated machine. The support assembly can include rings that are respectively coupled around a hydraulic line, a frame having an opening into which the rings can be mounted so as to allow rotation about their longitudinal axes while being retained in an axial direction within the frame opening, and optionally a second frame to which the first frame is mounted to enable rotation of the first frame around a second axis that is different from the longitudinal axes about which the rings can rotate. The hydraulic lines can thus be supported by the support assembly and can rotate and move in response to torsional and/or other forces applied on the lines during operation.

Figure 1:
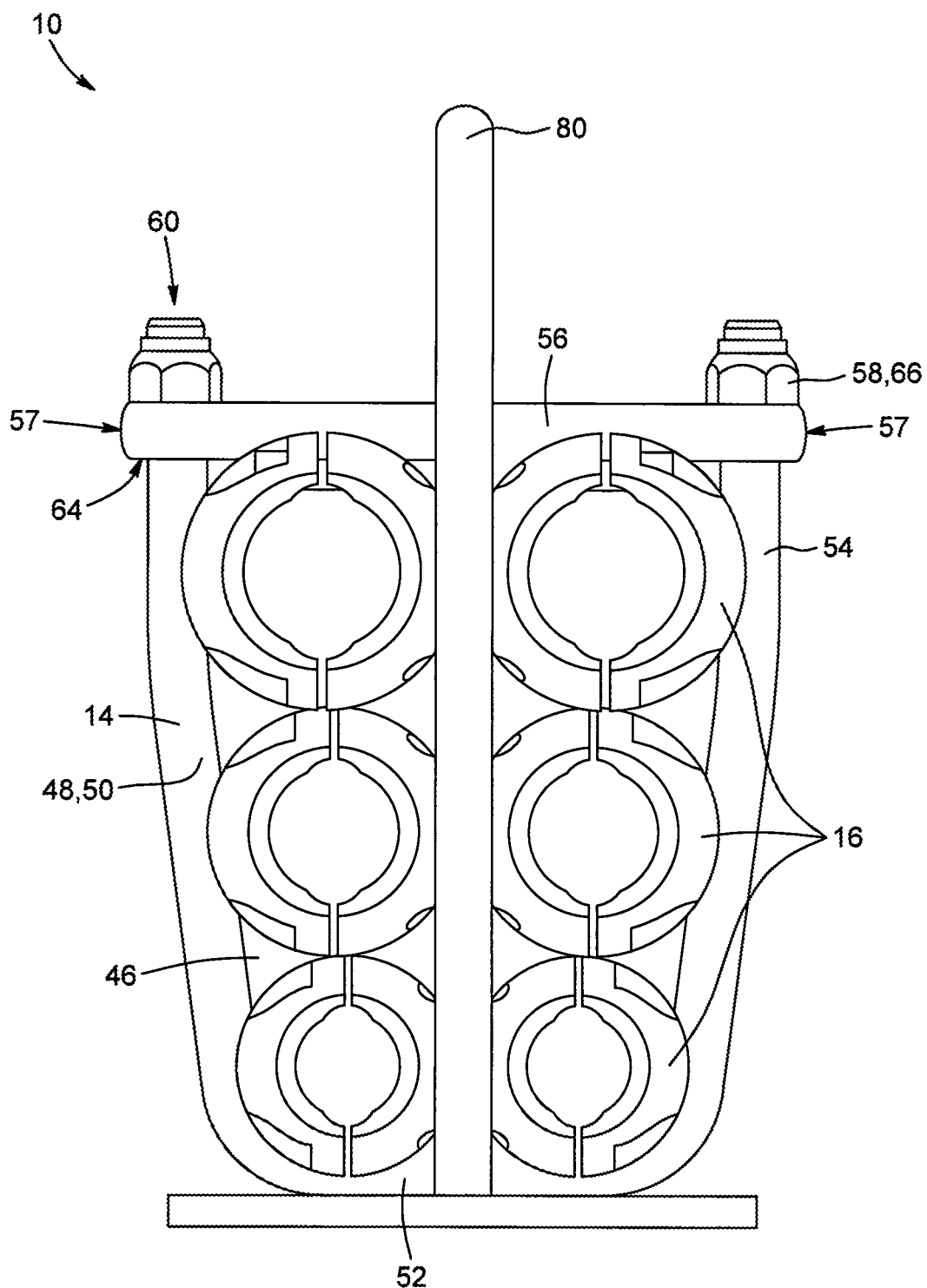
FIG. 1 is a front view of a support assembly, in accordance with an embodiment.

Referring to FIG. 1, a support assembly 10 in accordance with a possible embodiment is shown. The support assembly 10 is configured to support one or multiple hydraulic lines of a hydraulically operated machine which are commonly used in the mining or forestry industries, for example. The support assembly 10 includes a frame 14 configured to house one or more rings 16. Each ring 16 being adapted to be secured about a hydraulic line, thus securing the hydraulic line(s) within the frame 14 of the assembly 10.

As illustrated in FIGS. 2 to 5, the ring 16 can include a pair of complementary components 18a, 18b configured to be removably connectable to one another. As illustrated, connecting the complementary components 18 together about the hydraulic line 12 forms the ring 16 and secures it to the hydraulic line. In order to connect the complementary components 18 to one another, each component 18 can be provided with at least one connection aperture 20 designed to align with the connection aperture 20 of the other complementary component 18. A connection member 22 can then be inserted into the aligned connection apertures 20, effectively securing the pair of complementary components 18 together, and forming the ring 16. In some embodiments, the connection member 22 is a bolt 24 insertable through the aligned connection apertures 20, and securable therein via a nut (not shown). However, it is appreciated that the connection member 22 can be, or include, any suitable fastener or fastening method adapted to extend through the connection apertures 20 and secure the complementary components 18 to one another. For example, and without being limitative, the connection apertures 20 can be threaded, and the connection member 22 can be a screw, or a threaded bolt. It should be apparent to those of skill in the art that various other mechanisms and/or methods for connecting the complementary components 18 together can be suitable.

Figure 2:
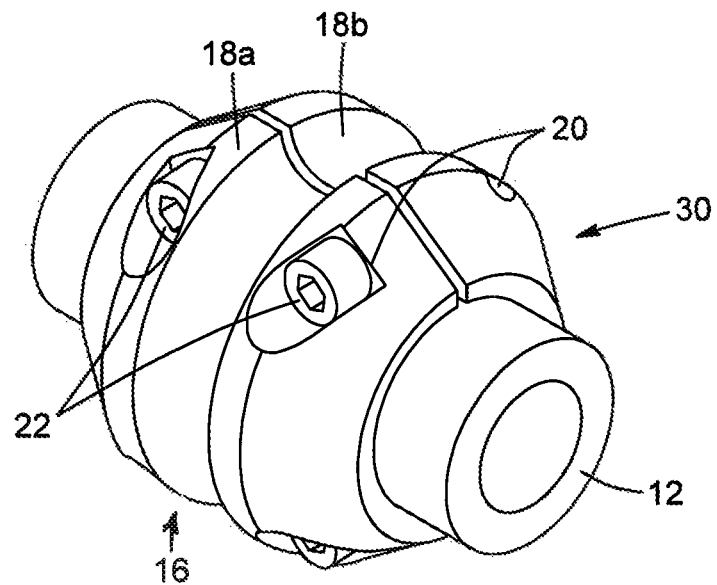
FIG. 2 is a front perspective view of a ring secured about a section of a hydraulic line.
Figure 3:
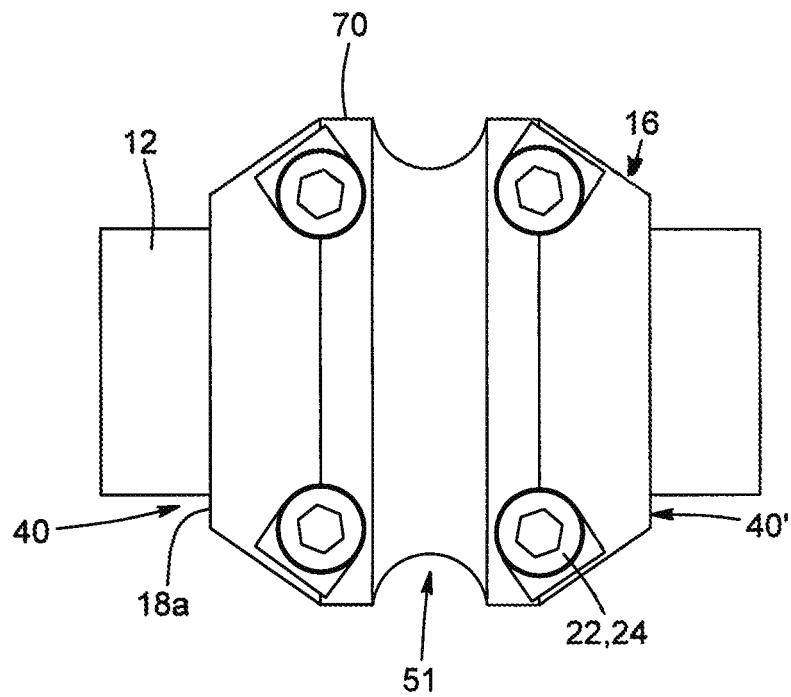
FIG. 3 is a side view of the ring shown in FIG. 2.

In addition, the complementary components 18 are preferably identical to each other so as to be reversible and interchangeable, which has advantages in terms of manufacturing and assembly. However, in alternative embodiments, it is appreciated that the complementary components 18 can be different from each other. Moreover, while it is preferred to have only two complementary components forming the ring 16, as illustrated in FIG. 2, it is also possible to have more that two components 18 secured together to form the ring 16.

Figure 4:
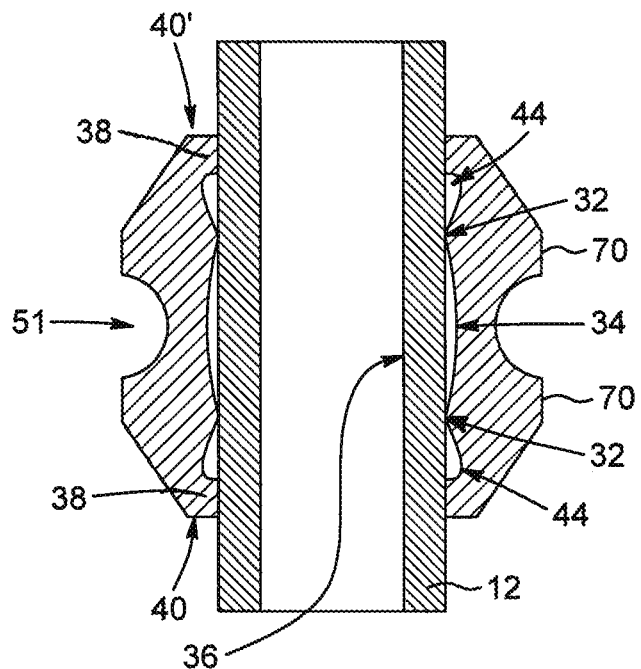
FIG. 4 is a top cross-sectional view of the ring shown in FIG. 2.
Figure 5:
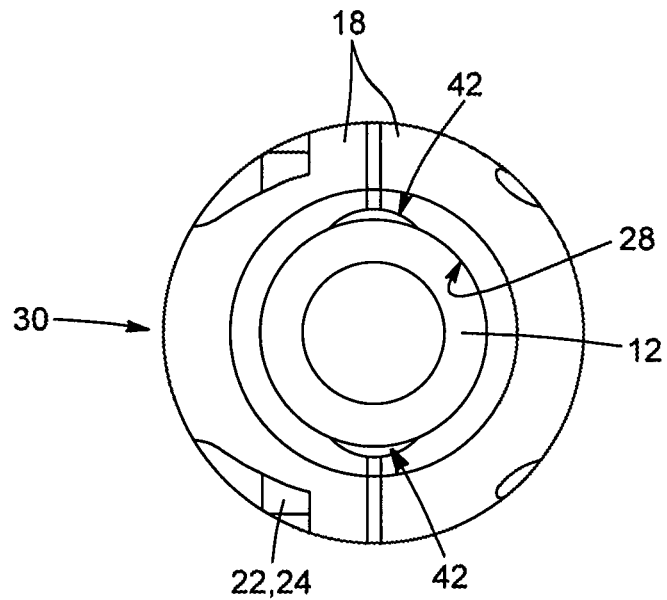
FIG. 5 is a front view of the ring shown in FIG. 2.

Referring more specifically to FIGS. 4 and 5, each ring 16 includes an inner surface 28 facing the hydraulic line 12 and an outer surface 30 facing outwardly, opposite the inner surface 28. In this embodiment, the inner surface 28 of the ring 16 is adapted to grip the hydraulic line 12 and secure it within the ring 16. More specifically, and as illustrated in FIG. 4, the inner surface can have one or more protrusions 32 extending therefrom and being adapted to contact the hydraulic line 12. In some embodiments, the protrusions 32 can extend radially around most or all of a periphery of the hydraulic line 12. The protrusions 32 can be shaped as "teeth" to effectively grip the hydraulic line 12 once the complementary components 18 are secured together. Alternatively, the protrusions 32 can have various shape features, e.g., a tip that is generally round or pointed, a gradual slope leading up to the tip, where the slope can be curved (e.g., concave) or straight, and where the slope can be the same on both sides of the tip or not, etc. In other embodiments, the inner surface 28 can include any suitable number of protrusions 32 shaped in any suitable manner to grip and secure the hydraulic line within the ring 16.

In this embodiment, the protrusions 32 are spaced apart from each other along a length of the hydraulic line 12 defining therebetween a central portion 34 of the inner surface 28. The central portion 34 has a concave shape such that a central section 36 of the hydraulic line 12 is substantially free of contact from the ring. The size and shape of the protrusions 32 can be provided so that the central section 36 of the hydraulic line 12 bugles outwardly towards the inner surface 28 when the pair of complementary components 18 are secured together about the hydraulic line 12. The "bulging" central section 36 can therefore act as a self-locking section for the hydraulic line 12, effectively blocking the longitudinal movement of the hydraulic line 12 between the protrusions 32.

In addition, the inner surface 28 can include two projections 38 located at respective ends 40, 40' of the ring. The projections 38 extend inwardly in a similar manner as the protrusions 32 to contact the hydraulic line 12. However, the projections 38 serve as a simple contact surface between the inner surface 28 and the hydraulic line 12. Similar to the protrusions 32, the projections 38 extend radially around the periphery of the hydraulic line 12. The projections can thus have shape features different from the protrusions, e.g., the projections can have a generally flat inward-facing surface that does not extend as far inwardly as the protrusions 32.

Referring to FIG. 5, the inner surface 28 of the ring 16 can also include at least one recess 42 that extends for the entire length of the ring; more specifically, the at least one recess 42 can extend between respective opposite ends of the ring 40, 40'. In this embodiment, the inner surface 28 includes two recesses 42 located opposite each other around the hydraulic line 12. The recesses can be defined along the respective joints of the complementary components 18. Each recess can have a generally smooth concave curvature such that its cross-section is generally a segment of an ellipse (e.g., a circle) that is preferably symmetrical about the joint between the complementary components. Alternatively, the inner surface 28 can include a single recess 42 or any number of recesses 42 provided at any suitable location around the inner surface 28 of the ring 16. In some embodiments, the recesses 42 define respective spaces between the inner surface 28 and the hydraulic line 12 to reduce or avoid pinching of the hydraulic line 12 which can cause damage to the hydraulic line 12, the ring 16, the frame 14 and/or to the hydraulically operated machine. It should be understood that the presence of the recesses 42 interrupts each protrusion 32 and projection 38, such that they do not extend radially around the entire periphery of the hydraulic line 12, i.e., the space defined by the recesses 42 does not include protrusions 32 and/or projections 38. Thus, in some embodiments, each protrusion 32, provided at any given location along the length of the ring, includes two protrusion elements on either side of the ring which are spaced apart from each other at either end by corresponding recesses. A similar configuration can also be described for the projections including two projection elements spaced apart from each other at either end by the recesses.

Referring back to FIG. 4, the projections 38 are spaced apart from the protrusions 32, thus defining secondary concave regions 44 along the inner surface 28. The hydraulic line 12 is substantially free of contact in the secondary concave regions 44, similar to the central portion 34. The secondary concave regions 44 offer clearance between the inner surface 28 and the hydraulic line 12. In some embodiments, the opposite ends 40, 40' can be tapered outwardly causing the hydraulic line 12 to be flared when exiting respective ends of the ring 16. Each ring 16 is designed in such a way that it does not reduce or hinder the flexibility of the hydraulic lines 12, thus protecting the hydraulic line's radius of curvature, especially when operating the machinery the hydraulic line 12 is connected to. Moreover, by protecting the radius of curvature of the hydraulic lines 12, the rings 16 are able to increase the lifespan of the hydraulic lines 12 thus reducing maintenance costs of the machinery they are attached to. Each ring 16 of the present embodiment allows for easy access to individual hydraulic line 12 and make for easy adjustments before, during and/or after installation.

Furthermore, the rings are preferably adapted to clamp around a middle section of a single hydraulic line, rather than clamping around end section of two lines to join them end-to-end. The rings can be mounted within the frame such that all of the rings have axes that are parallel to each other in static positions and while rotating, although alternative configurations are possible. In addition, the rings can be aligned within the frame in various ways. For example, the rings can be aligned to form columns of rings where the centers of some or all of the rings are aligned in a straight line, although other configurations are possible. The frame preferably has cooperative surfaces that are substantially the same at all points that interact with the external surfaces of the rings, and the external surfaces of the rings are also all the same. In some implementations, this means that the surfaces of the rings and the frame have the same radius of curvature and general size and configuration for all rings, and at all locations around the frame. In addition, the rings can be the same or different. When the rings include some rings that are different from others, the differences can include having different outer diameters (OD) and/or different inner diameters (ID) that define the cavity in which the hydraulic line is held. In other words, ODs can be different while IDs are the same, ODs can be the same while IDs are different, or both the ODs and the IDs can be different, depending on the size of hydraulic line that is to be supported, the type and configuration of the frame, and other factors. In some embodiments, the rings can be provided with abutment surfaces to allow the rings to contact one another within the frame. Preferably, the abutment surfaces of the rings are provided in a manner such that, despite difference in sizes between the rings, the abutment surfaces can still come into contact and provide the desired support while also allowing the surfaces to slide (i.e., when the rings rotate).

Figure 6:
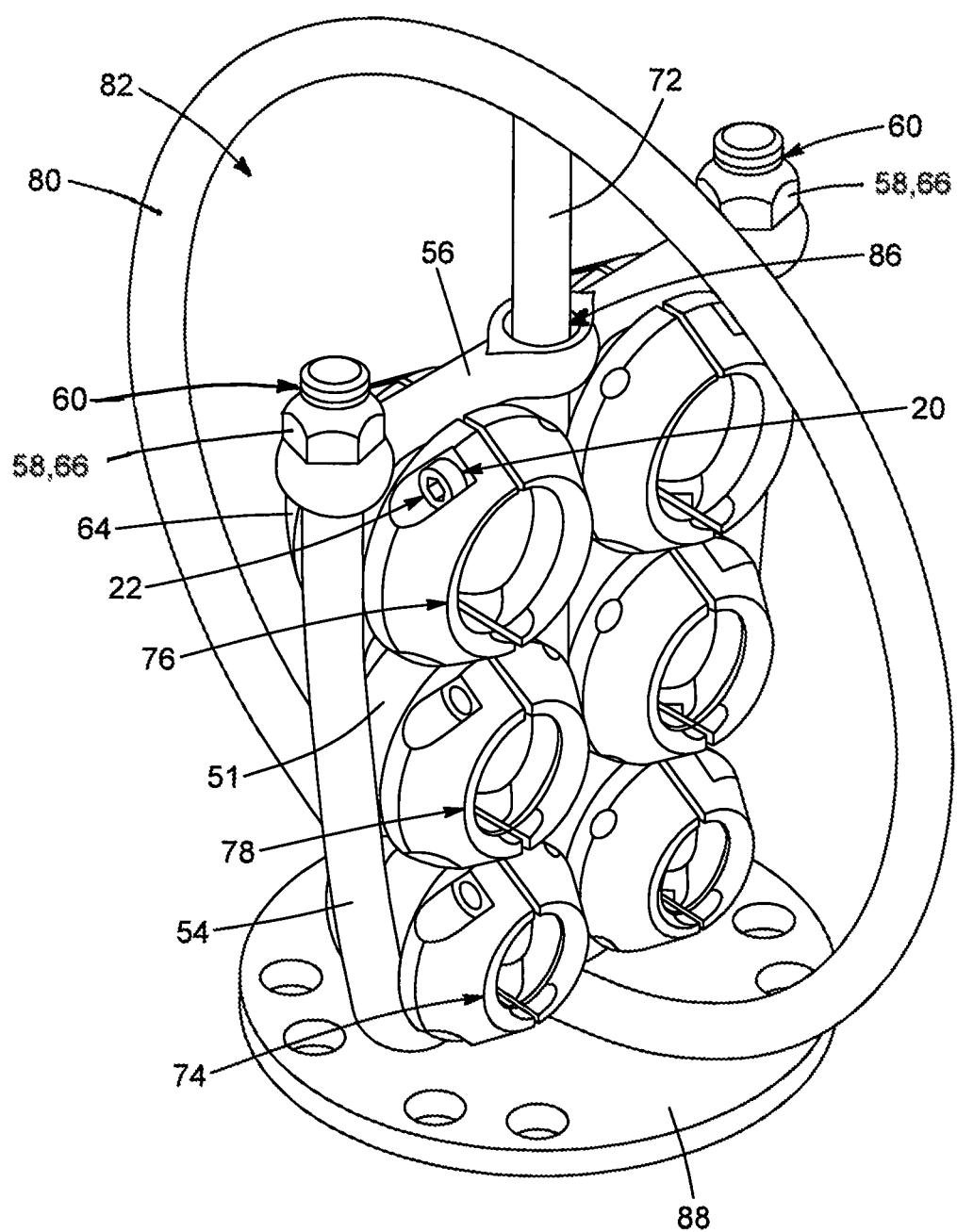
FIG. 6 is a front perspective view of the support assembly of FIG. 1.
Figure 7:
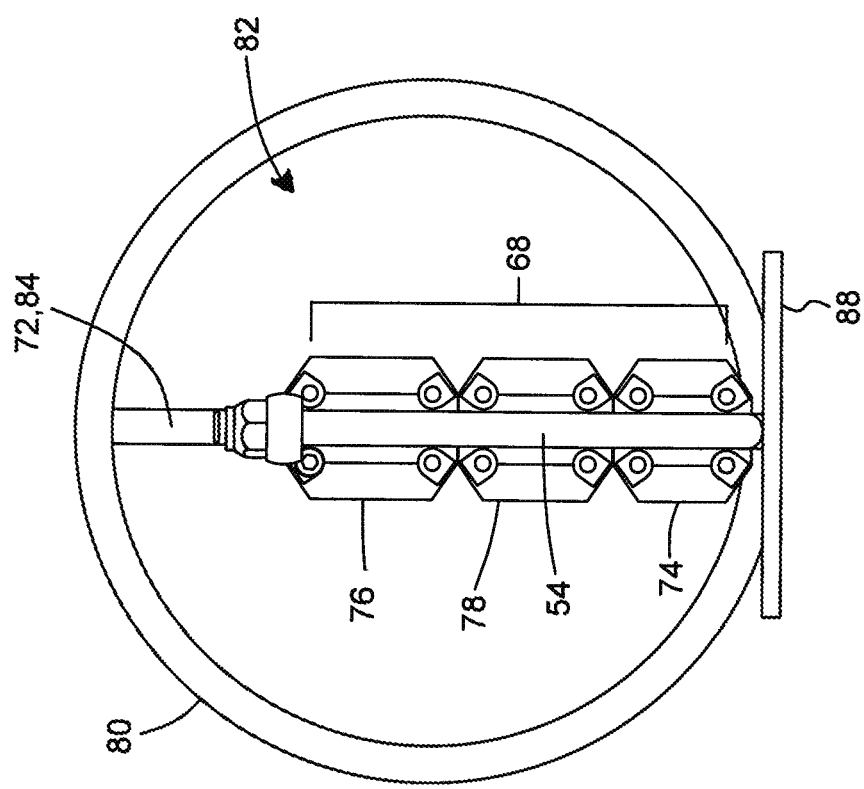
FIG. 7 is a side view of the support assembly of FIG. 1.
Figure 22:
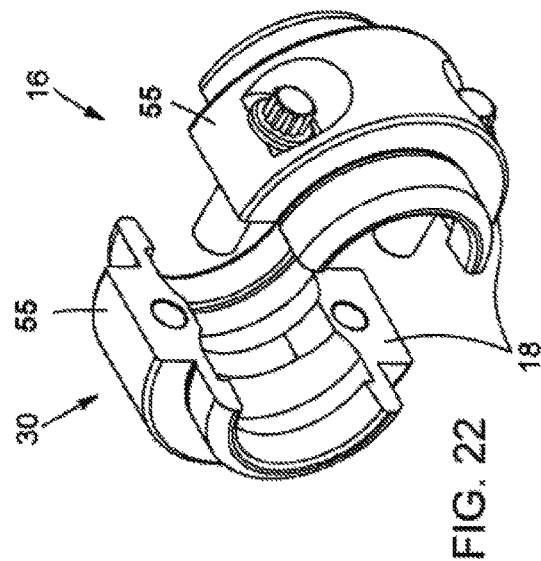
FIG. 22 is an exploded perspective view of a ring according to an embodiment, showing a central portion thereof having a larger diameter than the ends.

Now referring to FIGS. 6 and 7, in addition to FIG. 1, the frame 14 can include cooperative surfaces designed to cooperate with the outer surface of the rings 16. This cooperation is achieved through a convex-concave configuration between the frame 14 and the rings 16. Preferably, the cooperative surfaces of the frame include a convex region and the outer surface of the rings 16 includes a concave region. These regions being designed to contact and cooperate with each other thus securing the rings 16 within the frame 14. Alternatively, the cooperative surfaces of the frame 14 can comprise a concave region and the outer surface of the rings can comprise a convex region (as seen in FIG. 22). Once again, these regions are designed to contact and cooperate with each other. In both these cases, the rings 16 can rotate about their longitudinal axis with respect to the frame 14, thus reducing the strain applied to the hydraulic lines 12 from external sources. The rings 16 are preferably independently rotatable with respect to each other. Other constructions are also possible, e.g., the surfaces of the rings can have both concave and convex parts that cooperate with corresponding convex and concave parts of the frame. In alternate embodiments, other configurations of cooperation between the frame 14 and the rings 16 are possible as long as the rings are retained within the frame, and are allowed to rotate about their longitudinal axis with respect to the frame.

In some embodiments, the frame 14 defines an opening 46 and includes cooperative surfaces 48 (FIG. 1) configured to contact and cooperate with the outer surface 30 of each ring 16. More specifically and as mentioned hereinabove, the cooperative surfaces 48 of the frame 14 include a convex region 50, while the outer surface 30 of each ring 16 includes a concave region 51. The convex region 50 of the cooperative surfaces 48 is adapted to cooperate with the concave region 51 of the outer surface 30 of the rings 16 to effectively retain the rings within the opening 46 and secure the rings in an axial direction. Furthermore, the concave and convex regions 51, 50 can be arranged in such a way that a play exists therebetween. This configuration facilitates rotation of the rings 16 about the axial direction in response to torsional forces that may be exerted on the hydraulic lines 12 (e.g., when operating the hydraulically operated machine). For example, the concave region 51 of the rings can be "U-shaped" and the frame members can include tubes adapted to cooperate with the concave "U-shape" of the outer surface 30. Alternatively, the concave region 51 and the convex region 50 can have different shapes and sizes suitable for cooperation between the two regions 50, 51, and thus effectively retain the rings 16 within the opening 46 of the frame 14.

In some embodiments, the frame 14 includes a plurality of frame members. More specifically, the frame 14 can include a bottom member 52, side members 54, a top member 56 and frame fasteners 58. In this embodiment, the side members 54 extend upwardly from the bottom member 52 and are respectively provided with a top end 60. Additionally, the top member 56 includes opposed ends 62 which can be provided with apertures 64 adapted to receive the top ends 60 in order secure the top member 56 to the side members 54 via the frame fasteners 58. In this embodiment, the top end 60 of each side member 54 is threaded, and the frame fasteners 58 are a pair of nuts 66 adapted to secure the top end 60 of the side members within the apertures 64.

As mentioned hereinabove, the frame 14 can be configured to retain a plurality of rings 16 within the opening 46 for securing a plurality of hydraulic lines 12. In this embodiment, the rings 16 are positioned vertically within the opening 46 and thus define a vertical stack of rings 68. In order for the vertical stack 68 to be stable, the concave region 51 of the outer surface 30 of each ring 16 is provided with seats 70 (FIG. 2), also referred to as abutment surfaces, located on either side of the concave region 51. The seats 70 provide a substantially flat surface to provide generally stable contact between each adjacent ring 16.

Figure 8:
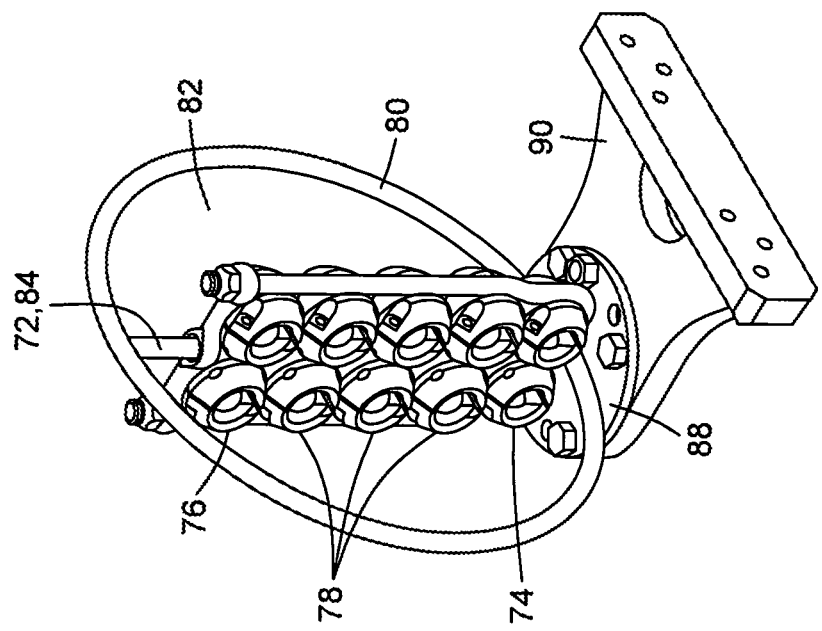
FIG. 8 is a front perspective view of another embodiment of a support assembly, comprising more rings within the frame.

Now referring to FIGS. 6 to 8, the frame 14 can include a middle member 72 extending upwardly from the bottom member 52. Similar to the other members of the frame 14, the middle member 72 includes cooperative surfaces 48 designed to cooperate with the outer surface 30 of the rings 16. In this embodiment, the middle member 72 is positioned between the two side members 54, effectively dividing the opening 46, therefore defining two side-by-side openings 46 to allow an additional stack of rings 68 to be inserted therein. Alternatively, more than one middle member 72 can be provided within the frame 14, allowing for even more stacks 68 to be inserted.

It will be understood that each stack of rings 68 includes a bottommost ring 74, an uppermost ring 76 and middle (or intermediate) rings 78 disposed between the bottommost and uppermost ring 74, 76. In this embodiment, the concave region 51 of the bottommost ring 74 is adapted to cooperate with the convex region 50 of the bottom member 52, at least one of side member 54, and the middle member 72. In the same manner, the concave region 51 of the uppermost ring 76 is adapted to cooperate with the convex region 50 of the top member 56, at least one side member 54, and the middle member 72. Finally, the concave region 51 of the middle rings 78 is adapted to cooperate with the convex region of at least one side member 54 and middle member 72. In some embodiments, the side members 54 can extend upwardly from the bottom member 52 at an angle, either toward or away from each other. Therefore, the opening 46 can be widened or narrowed towards the top end 60 of the side members 54, thus allowing rings 16 of different radii to be inserted within the opening 46.

Still referring to FIGS. 6 to 8, the support assembly 10 can also include a second frame 80 which defines an open space 82 adapted to receive the frame 14, and thus the rings 16. In this embodiment, the second frame 80 includes a coupling member 84 configured to connect the frame 14 to the second frame 80 while allowing rotation of the frame 14 about the coupling member 84. In other words, the frame 14 can rotate about the coupling member 84, while being retained within the open space 82 of the second frame 80. In this embodiment, the rotation of the frame 14 within the second frame 80 is perpendicular to the rotation of the rings 16 within the frame 14 to further protect the hydraulic lines 12 secured with the support assembly 10. More specifically, the rotation of the support assembly 10 about two axes reduces the strain that would be exerted on the hydraulic lines 12 from the result of movement of the hydraulically operated machine or from external forces.

In some embodiments, the coupling member 84 of the second frame 80 can be a portion of the middle member 72, or an extension thereof. Furthermore, the top member 56 can be provided with a central aperture 86 configured to receive the coupling member 84, effectively securing the top member 56 within the open space 82. In this configuration, the top member 56 is secured simultaneously to the side members 54 via the frame fasteners 58, and to the coupling member 84 to secure the frame 14 within the open space 82. Finally, the support assembly 10 can include a base plate 88 fixedly connected to the second frame 80 and adapted to be attached to a bracket 90 which in turn can be attached to the hydraulically operated machine. The support assembly 10 can therefore be attached on the body of the machine at any given location to increase efficiency.

In this embodiment, in order to access the opening 46 of the frame 14, the frame fasteners are removed from the top ends 60 of the side members 54 to disengage/disconnect the top member 56 from the side members 54. The rings 16 can then be inserted or removed from the opening 46 of the frame 14 through the opened top end. Afterwards, the top member 56 is reconnected to the side member 54 and secured thereto via the frame fasteners. In the present embodiment, each ring 16 secures its corresponding hydraulic line 12 and can be individually adjusted without disrupting the integrity of the support assembly 10. In other words, the connection member 22 of any given ring 16 can be removed to separate, or completely disconnect the pair of complementary components 18. This allows the hydraulic line 12 to move freely along the axial direction without having to disengage the ring 16 from the frame 14, or the support assembly 10 from the machinery it is attached to.

Figure 10:
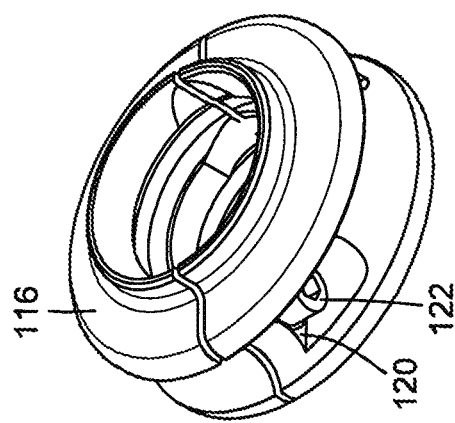
FIG. 10 is a front perspective view of a ring designed to be retained by the frame shown in FIG. 9, according to an embodiment.
Figure 11:
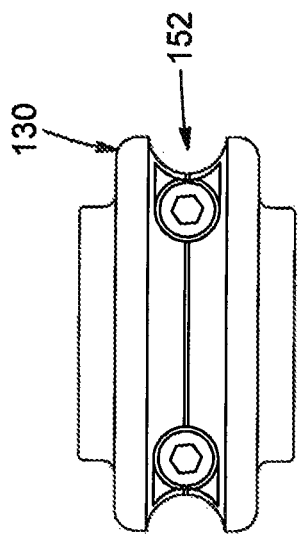
FIG. 11 is a side view of the ring shown in FIG. 10.
Figure 9:
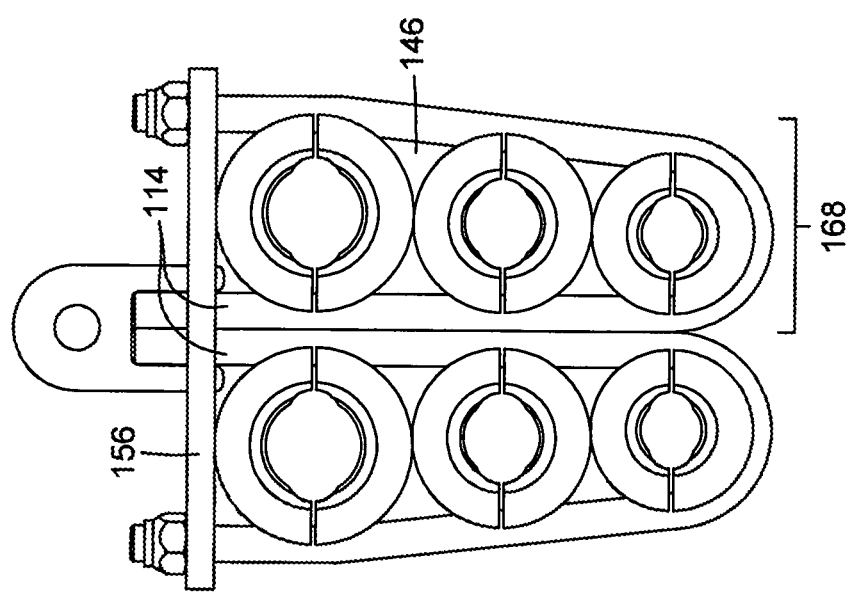
FIG. 9 is a front view of a support assembly, according to another possible embodiment.

Now referring to FIGS. 9 through 21, alternative embodiments of the support assembly 10 are illustrated. FIGS. 9 to 11 illustrate such an embodiment, in this case, the frame 114 is configured to retain within its opening 146 a single stack of rings 168. However, the top member 156 is designed to secure two frames 114 side by side. In this embodiment, the connection apertures 120 and the connection members 122 are positioned in the concave region 152 of the outer surface 130 of the rings 116.

Figure 14:
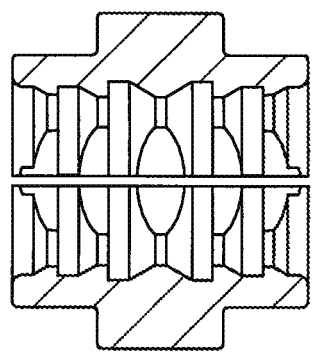
FIG. 14 is a cross-sectional view of the ring shown in FIG. 13.
Figure 13:
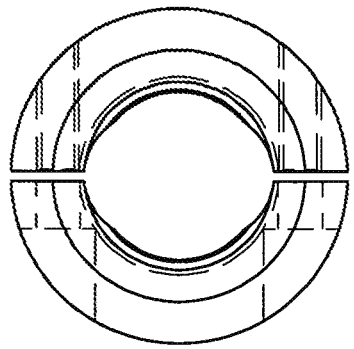
FIG. 13 is a front view of a ring designed to be retained by the frame of FIG. 12, according to an embodiment
Figure 12:
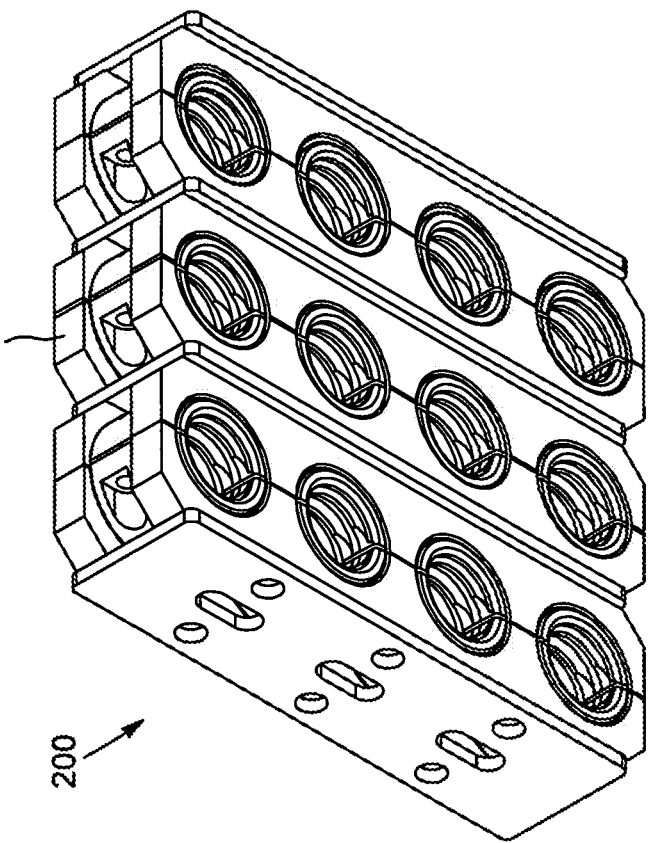
FIG. 12 is a front perspective view of a support assembly according to another embodiment.

FIGS. 12 to 14 illustrate another embodiment 200. In this case, the frame 214 comprises a concave region and the rings 216 comprise a convex region, the concave region and convex region are configured to cooperate together in order to retain the rings 216 within the frame 214.

Figure 16:
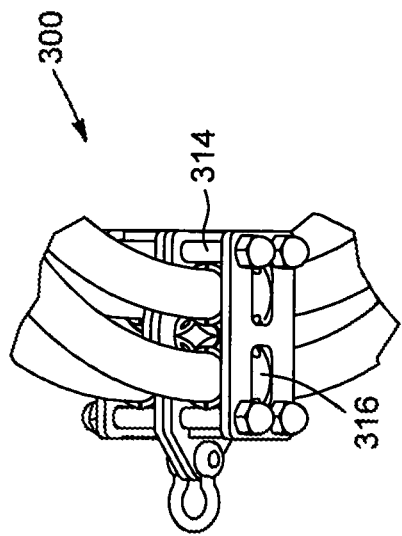
FIG. 16 is a front perspective view of an alternate configuration of the support assembly shown in FIG. 15.
Figure 17:
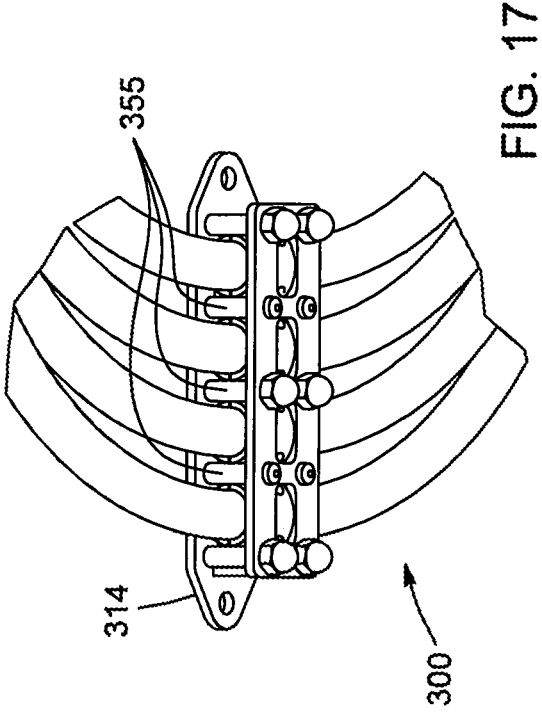
FIG. 17 is front perspective view of an alternate configuration of the support assembly shown in FIG. 15, retaining a single stack of rings.
Figure 15:
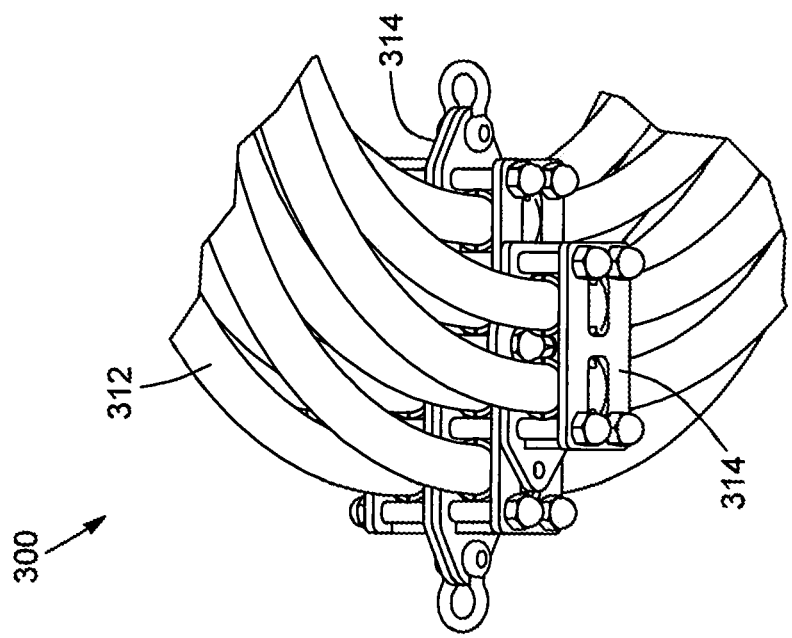
FIG. 15 is a front perspective view of a support assembly according to another embodiment.

FIGS. 15 to 17 illustrate yet another embodiment 300. In this case, the ring 316 comprises a convex region which is inserted into openings located on the frame 314. The frame being designed to be attached to other frames 314 in order to create a group of hydraulic lines 312. Furthermore, the rings 316 are vertically separated by additional frame members 355.

Figure 19:
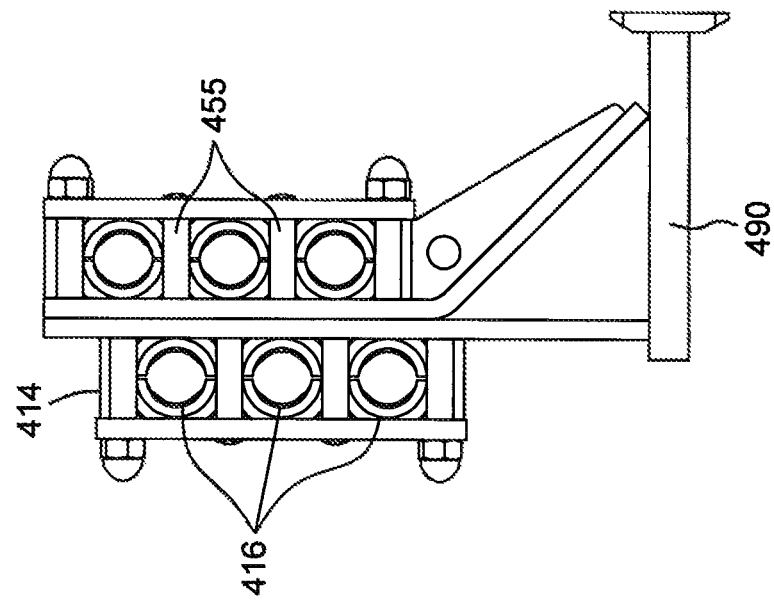
FIG. 19 is a front view of the support assembly shown in FIG. 18.
Figure 18:
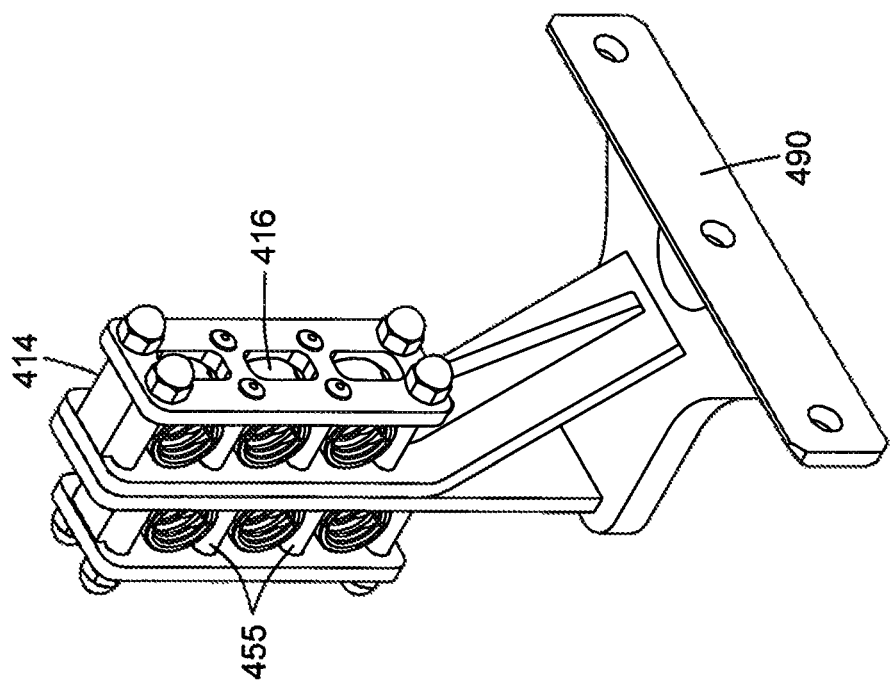
FIG. 18 is a front perspective view of a support assembly according to another embodiment.

FIGS. 18 and 19 illustrate another embodiment of the support assembly. In this embodiment, the ring 416 comprises a convex region which is inserted into openings positioned on the frame 414. The frame 414 is fixedly attached to a support member (or bracket) 490 configured to be attached to the hydraulically operated machine. The rings 416 are also vertically separated by additional frame members 455.

Figure 21:
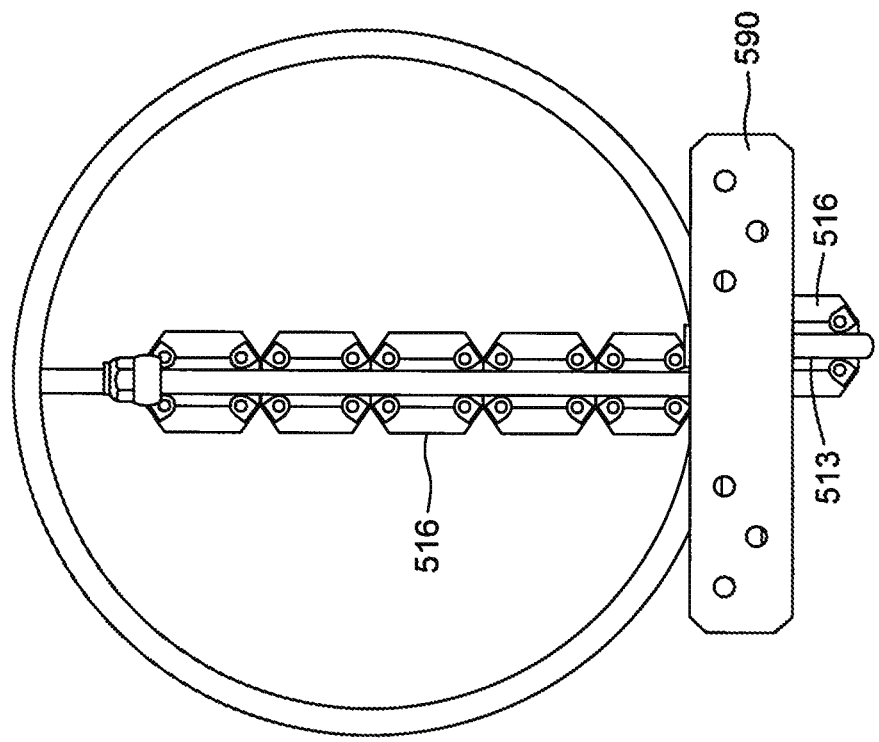
FIG. 21 is a side view of the support assembly shown in FIG. 20.
Figure 20:
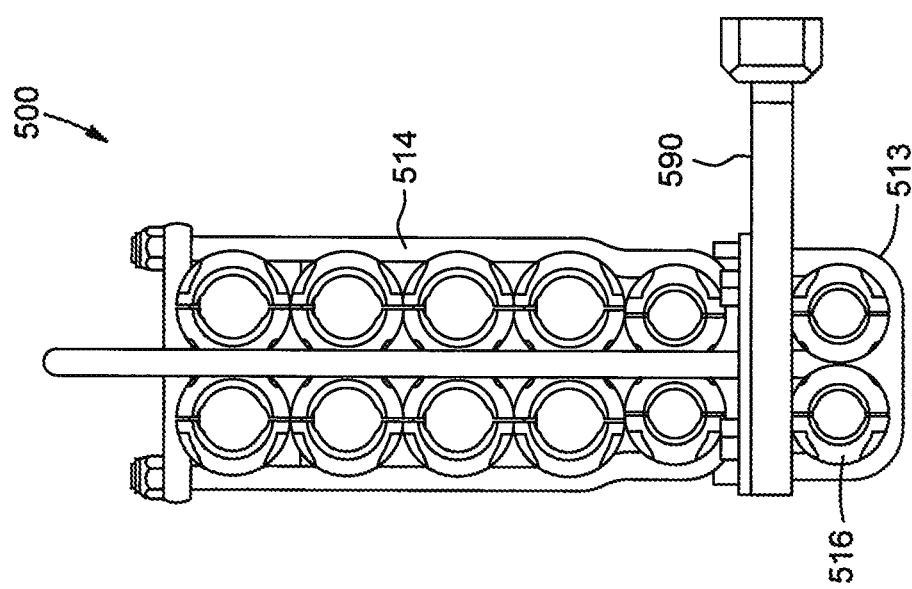
FIG. 20 a front view of a support assembly according to another embodiment, showing a sub-section of the frame positioned below the base plate.

FIGS. 20 and 21 illustrate another embodiment of the support assembly. In this case, the support assembly 500 comprises a sub-section 513 of the frame 514 positioned below the bracket 590. In the embodiment illustrated, two rings 516 are retained within the opening of the sub-section 513. However, in other embodiments it can be possible to have a larger sub-section 513 or even multiple sub-sections 513 in order to house more rings 516 below the bracket 590.

Figure 23:
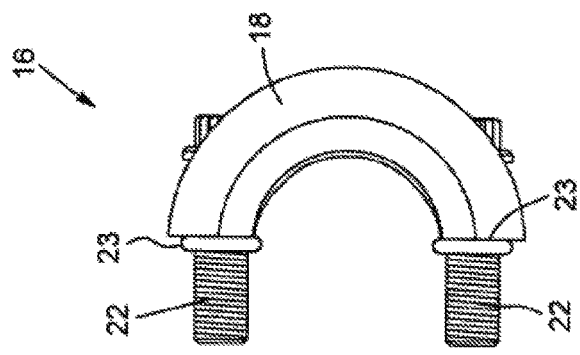
FIG. 23 is a front elevation view of the ring shown in FIG. 22.
Figure 23A:
FIG. 23A is a cross-sectional view of the ring shown in FIG. 23 taken along the line 23A-23A.
Figure 23A:
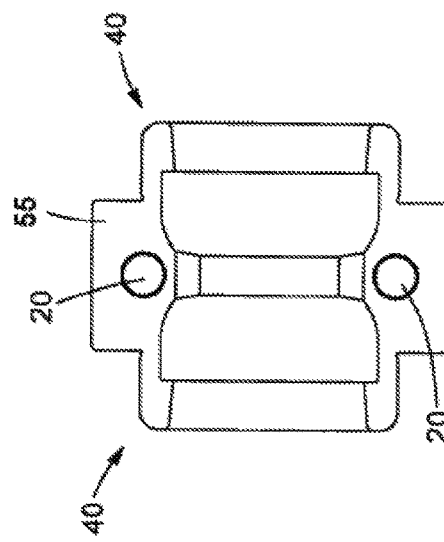

Now referring to FIGS. 22 to 23A, an alternate embodiment of a ring 16 is provided. In this embodiment, the outer surface 30 of the ring 16 includes a central section 55 extending around an outer periphery thereof. It should be apparent that the diameter of the central section 55 is greater than the diameter of each end 40, 40' of the ring 16 extending in opposite directions on either side of the central section 55. Each ring 16 is adapted to cooperate with a frame in order to secure the ring 16 therein in a manner that will be described further below. The ring 16 is made up of two complementary components 18 connected to one another using connecting members 22 (e.g., threaded bolts) extending through connecting apertures 20. In the present embodiment, each bolt 22 can be adapted to extend through the connecting apertures 20 of a first one of the complementary components, allowing the threaded ends of the bolts 22 to be inserted within a second one of the complementary components. In some embodiments, once the bolt is connected to the first component 18, an O-ring 23 can be connected to the bolt to secure the bolt within the connecting aperture 20 to facilitate connection of the complementary components 18.

Figure 25A:
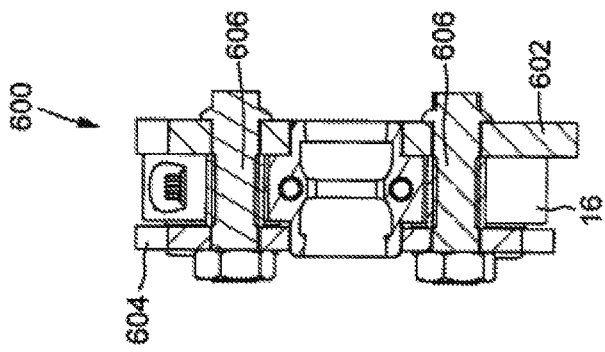
FIG. 25A is a cross-sectional view of the plate assembly shown in FIG. 25 taken along the line 25A-25A.
Figure 24:
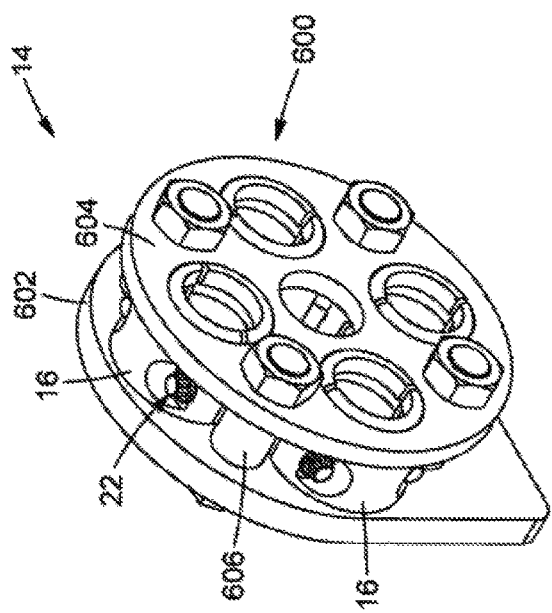
FIG. 24 is a perspective view of a frame according to an embodiment, showing a plate assembly securing multiple rings therein.
Figure 25:
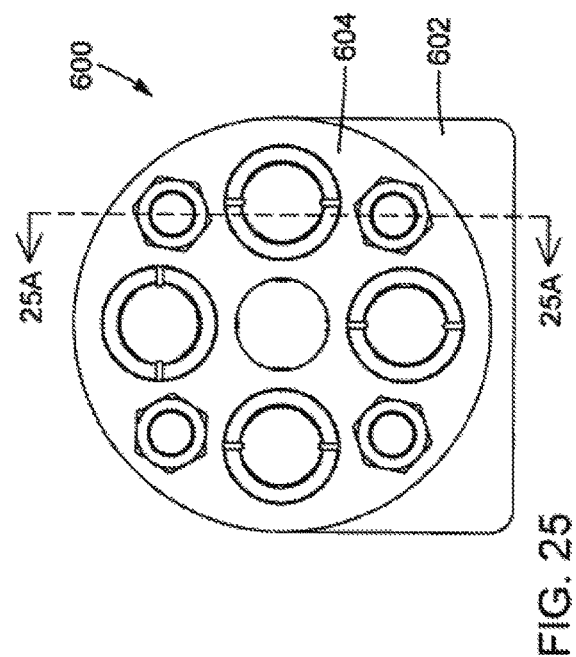
FIG. 25 is a front elevation view of the plate assembly shown in FIG. 24.

With reference to FIGS. 24 to 25A, an alternate embodiment of the frame 14 is provided. In this embodiment, the frame 14 includes a plate assembly 600 adapted to secure the rings therein. More specifically, the plate assembly 600 includes a main plate 602 connectable to the hydraulically operated machinery, either fixedly (e.g., by welding) or removably via fasteners. In addition, the plate assembly 600 includes a cap plate 604 removably connectable to the main plate 602, the cap plate 604 and main plate 602 being adapted to secure the rings 16 therebetween. In this embodiment, the cap plate 604 is provided with one or more spacing sleeves 606 extending therefrom and being adapted to abut against the main plate 602 to effectively space the cap plate 604 with respect to the main plate 602, and allow the rings 16 to be disposed therebetween. The main plate 602 can be provided with holes adapted to be aligned with the spacing sleeves 606, and each spacing sleeve 606 is adapted to allow a fastener (e.g., a bolt) to extend therethrough (i.e., the sleeves would thus be hollow), and thus through the main plate 602, as illustrated in FIG. 25A. The fastener can then be secured within the spacing sleeve 606 using any know method or accessory, such as a nut and/or an O-ring for example. Fastening constructions other than the bolt-and-sleeve configuration illustrated in these figures can also be provided for fastening the plates in spaced relation to each other and providing cooperative surfaces for the rings.

In this embodiment, the plates 602, 604 are further provided with ring apertures 608 (FIG. 25) adapted to respectively receive and secure the rings 16 within the plate assembly 600. In this embodiment, each plate is provided with four ring apertures 608 adapted to align with the ring apertures 608 of the other plate. However, it should be apparent that other numbers of ring apertures 608 can be suitable. In some embodiments, one or more rings 16 can be mounted onto the main plate 602 by having one of the ends 40, 40' extend within corresponding ring apertures 608, such that the central sections 55 abuts against the main plate 602. Once the rings 16 are positioned, the cap plate 604 can be mounted onto the other one of the ends 40, 40' of the rings 16 in a manner such that the end extends through the ring apertures 608 of the cap plate 604. Finally, the cap plate 604 can be secured to the main plate 602 via fasteners extending through the spacing sleeves 606, as described above.

In some embodiments, the rings 16 are positioned between the main plate 602 and cap plate 604 in a manner that advantageously allows access to the connecting members 22 without having to disassemble the plates from one another. In this embodiment, the spacing sleeves 606 are shaped and sized to provide an axial play for each ring 16 mounted within the plate assembly 600. It should be understood that the axial play can allow the rings 16 to rotate about a longitudinal axis while remaining mounted in the frame 14 in order to adequately position the connection members 22 to provide access thereto. Additionally, the ring apertures 608 can be adapted to provide a radial play allowing the ends of the rings 40, 40' to move within the apertures 608. In this embodiment, the radial play allows the rings 16 to be loosened (i.e., the complementary components can be partially separated from each other) to allow axial adjustment of the hydraulic lines within the rings 16. The allowed movement of the rings 16 provided by the axial and radial plays can also provide additional maneuverability for the hydraulic lines secured within the rings 16 and thus reduce the strain applied thereon from external forces.

Figure 28:
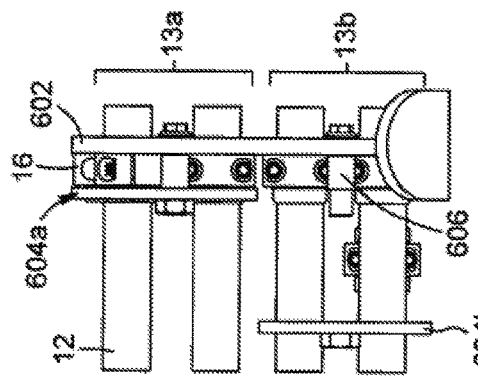
FIG. 28 is a side elevation view of the plate assembly shown in FIG. 26, showing multiple hydraulic lines (or hoses) secured by the rings in the plate assembly.
Figure 26:
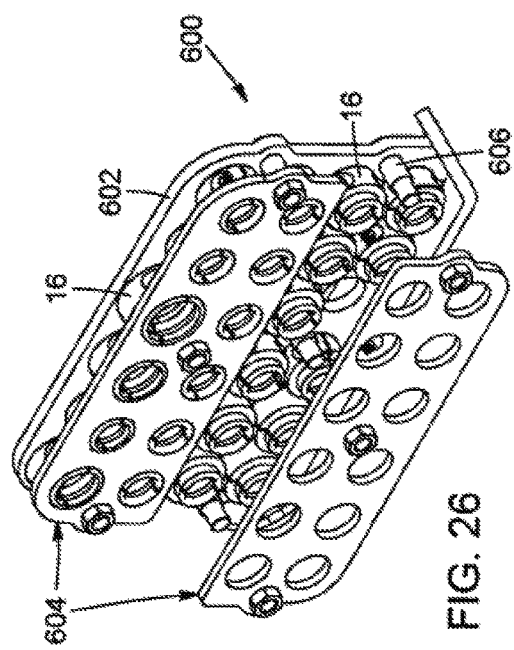
FIG. 26 is a partially exploded perspective view of a plate assembly according to an embodiment, showing a pair of cap plates mounted onto a main plate for securing a plurality of rings therebetween.
Figure 27:
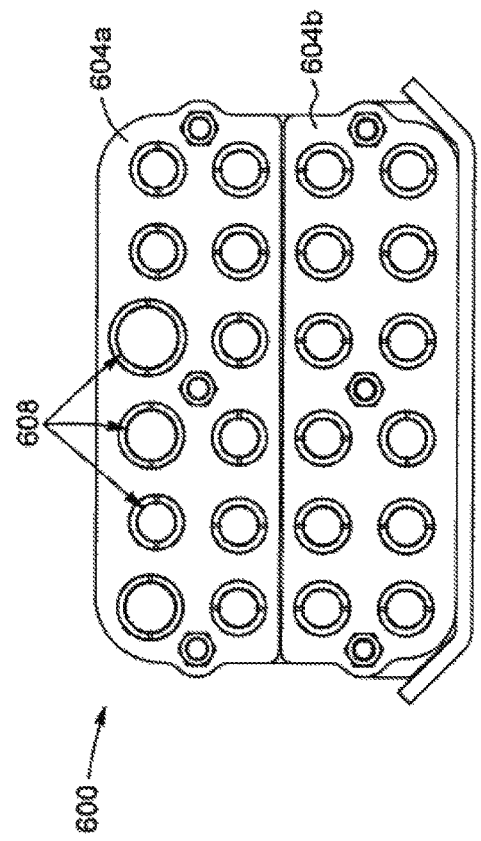
FIG. 27 is a front elevation view of the plate assembly shown in FIG. 26.

FIGS. 26 to 28 illustrate another possible embodiment of the plate assembly 600. In this embodiment, the plate assembly 600 includes additional cap plates 604 connectable to the main plate 602 to provide access to specific sections of the plate assembly 600. In some embodiments, the hydraulic lines 12 can be separated in groups of hydraulic lines 13 secured within the plate assembly 600 by the rings 16. In other words, a first group of hydraulic lines 13a can be secured within the rings 16 provided in a first section of the main plate 602, and a second group of hydraulic lines 13b can be secured within the rings 16 provided in a second section of the main plate 602. It should be understood that the rings 16 securing the first group of hydraulic lines 13a are mounted within the plate assembly 600 via a first cap plate 604a, and that the rings 16 securing the second group of hydraulic lines 13b are mounted within the plate assembly 600 via a second cap plate 604b. It is appreciated that the plate assembly 600 can include any suitable amount of main plates 602 and/or cap plates 604 defining a plurality of sections for securing any suitable number of rings 16 therebetween.

In some embodiments, the ring apertures 608 can be identical to one another, i.e., adapted for securing rings 16 of the same size. However, it should be apparent that the size of the ring apertures 608 provided on the plate assembly 600 can vary in order to accommodate hydraulic lines 12 of various sizes. Additionally, it should be noted that access to the rings 16, and to the connection members 22 thereof, is advantageously not impeded/restricted by the presence of the plate assembly 600. Therefore, the hydraulic lines 12 can be axially adjusted whenever necessary with minimal manipulations (e.g., disassembly of the rings and/or plates).

Figure 29:
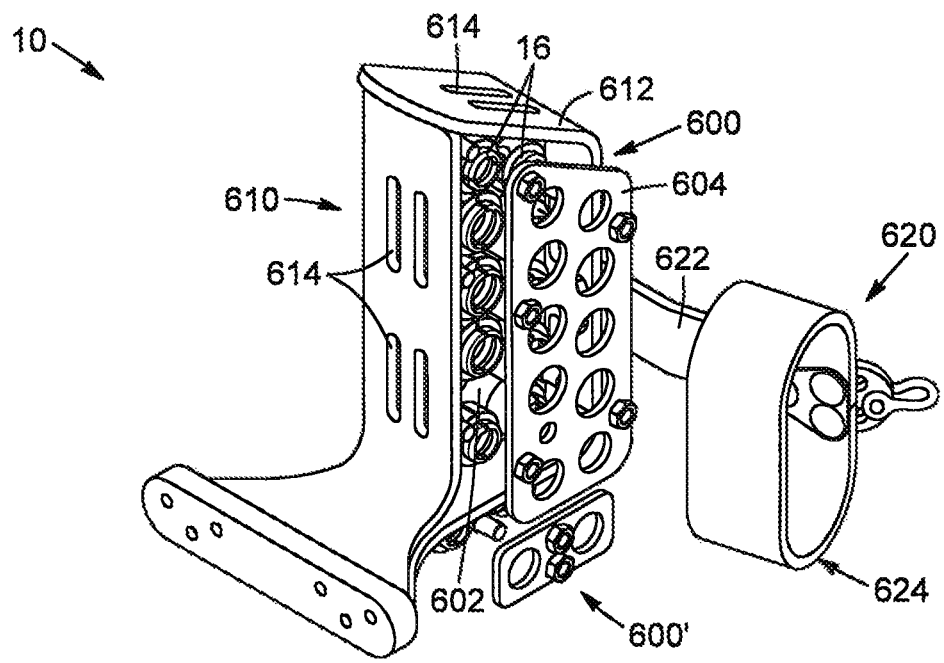
FIG. 29 is a partially exploded perspective view of a support assembly according to an embodiment, showing a mounting bracket surrounding a plate assembly, and a merging arm extending therefrom.
Figure 30:
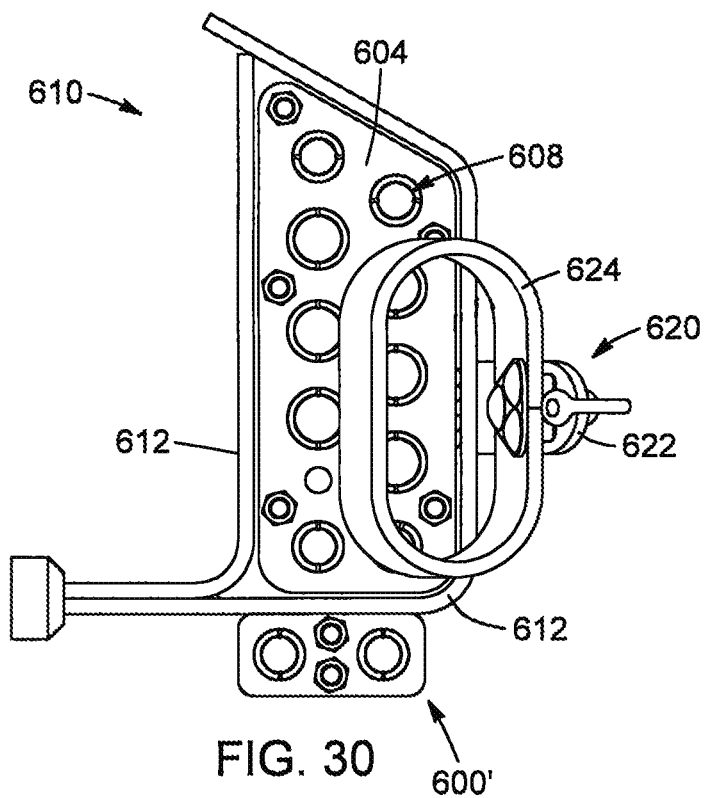
FIG. 30 is a front elevation view of the support assembly shown in FIG. 29.

Now referring to FIGS. 29 and 30, the support assembly 10 can include a mounting bracket 610 adapted to removably connect the plate assembly 600 to the hydraulically operated machinery. In this embodiment, the mounting bracket 610 includes a bracket frame 612, with the main plate 602 being mounted within an opening of the bracket frame 612, and the rings 16 being secured therein via the cap plate 604. In some embodiments, the bracket frame 612 can be provided with access points 614 adapted to allow access to the rings 16 mounted within the plate assembly 600, within the opening of the bracket frame 612. It should be understood that the access provided by the access points 614 allows the hydraulic lines to be axially adjusted with respect to the plate assembly 600, as described above in relation to previous embodiments. Additionally, the mounting bracket 610 can include a merging arm 620 adapted to band the hydraulic lines together away from the plate assembly 600, while also providing additional support to the lines. In some embodiment, the merging arm 620 includes an arm support 622 extending from the bracket frame 612 and being provided with a merging belt 624 connected at an end of the arm support 622. Each hydraulic line 12 can extend through the merging belt 624 so as to be banded together prior to extending through the plate assembly 600 and rings 16.

In some embodiments, the mounting bracket 610 can include a secondary plate assembly 600' extending from the bracket frame 612. As seen in FIGS. 29 and 30, the secondary plate assembly 600' can be substantially smaller than the plate assembly 600. In this embodiment, the secondary plate assembly 600' is adapted to secure a pair of hydraulic lines therein. However, it is appreciated that the secondary plate assembly 600 can be adapted to secure any suitable number of rings 16 therein, each for securing a corresponding hydraulic line 12.

It will be appreciated from the foregoing disclosure that there is provided a support assembly, which facilitates the support of individual hydraulic lines as well as a group of hydraulic lines, allows rotation of the hydraulic lines without causing damages to them or the machinery, increases the lifespan of the equipment, reduces maintenance costs, facilitates adjustments of the hydraulic lines among many other advantages. However, the scope of the claims should not be limited by the preferred embodiments set forth in the examples, but should be given the broadest interpretation consistent with the description as a whole.

It should also be understood that the elements of the drawings are not necessarily depicted to scale, since emphasis is placed upon clearly illustrating the elements and structures of the present embodiments, the drawings can be interpreted as being to scale but should not be limited as such. In the present description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

The invention claimed is:

1. A kit for assembling a support assembly for swivellably supporting a hydraulic line, comprising:
    a ring having an inner surface and an outer surface, the ring comprising a pair of complementary components that are securable together about a hydraulic line, the inner surface including a pair of protrusions spaced apart along a longitudinal axis of the ring and extending inwardly for contacting and securing the hydraulic line relative to the ring;
    a first frame defining an opening and having cooperative surfaces that face toward the opening, the cooperative surfaces of the first frame being configured to contact and cooperate with the outer surface of the ring to:
        retain the ring within the opening and secured in an axial direction; and
        permit rotation of the ring about the axial direction in response to torsional forces exerted on the hydraulic line; and
    a second frame adapted to be connected to a hydraulic machine, the first frame being rotatably attached to the second frame such that the first frame can rotate about a secondary axis that is different from the longitudinal axis about which the ring rotates.

2. A support assembly for swivellably supporting a group of hydraulic lines, comprising:
    plurality of rings fixedly mountable around respective hydraulic lines, each of the rings having a pair of complementary components that are removably connected together about a corresponding hydraulic line, each of the rings having internal surfaces comprising a pair of protrusions spaced apart along a longitudinal axis of the corresponding ring and extending inwardly for contacting and securing the hydraulic line relative to the corresponding ring, the pair of protrusions defining a central portion of the internal surface therebetween, each of the rings further having external surfaces;
    a first frame defining an opening to receive the rings and having inner surfaces configured to cooperate with the external surfaces of the rings when the rings are mounted within the opening, to allow rotation of the rings about respective longitudinal axes in response to torsional forces exerted on the hydraulic lines while retaining the rings within the opening; and
    a second frame adapted to be connected to a hydraulic machine, the first frame being rotatably attached to the second frame such that the first frame can rotate about a secondary axis that is different from the longitudinal axis about which the rings rotate.

3. The support assembly of claim 2, wherein the rings are mountable within the opening of the first frame so that, when each of the rings is in a static position:
    a cooperative portion of the external surfaces is in contact with corresponding cooperative portion of the internal surfaces of the first frame, and
    an abutment portion of the external surfaces is in contact with at least one adjacent ring of the rings.

4. The support assembly of claim 2, wherein the rings are positioned in the opening as a column of pairs of the rings.

5. The support assembly of claim 4, wherein the column is separated by a middle member dividing the opening into two adjacent openings, the middle member having inner surfaces for cooperating with the external surfaces of the rings.

6. The support assembly of claim 2, wherein the first frame is configured so that the opening has different widths for accommodating the rings of different external diameters therein.

7. The support assembly of claim 6, wherein the first frame is configured so that the first frame has a bottom width sized for receiving a first ring of the rings having a smallest external diameter, a middle width sized for receiving a second ring of the rings having a medium external diameter, and an upper width sized for receiving a third ring of the rings having a largest diameter.

8. The support assembly of claim 2, wherein the external surfaces of each of the rings include a concave region and the corresponding inner surfaces of the first frame comprise a convex region for cooperating therewith.

9. The support assembly of claim 2, wherein the external surfaces of each of the rings include a convex region and the corresponding inner surfaces of the first frame comprise a concave region for cooperating therewith.

10. The support assembly of claim 9, wherein the convex region and the concave region have generally smooth curvatures.

11. The support assembly of claim 2, wherein the frame is mounted to the second frame such that the secondary axis is perpendicular to the longitudinal axis about which the rings rotate.

12. The support assembly of claim 2, wherein the first frame is configured to have an open configuration for insertion of the rings and a closed configuration in which the rings are retained, the open configuration allowing the rings to be inserted laterally to engage the inner surfaces of the frame.

13. The support assembly of claim 12, wherein the first frame comprises a removable member such that, in the open configuration, the first frame has a general U-shape.

14. The support assembly of claim 2, wherein the central portion is concave such that the hydraulic line is substantially free of contact from the internal surface along the central portion, and wherein the pair of protrusions engages the hydraulic line in a manner such that the hydraulic line bulges outwardly within the concave central portion for blocking movement of the hydraulic line in the direction of the longitudinal axis.

15. The support assembly of claim 2, wherein the internal surface is tapered outwardly proximate opposite ends thereof.

16. The support assembly of claim 12, wherein the first frame comprises a first frame member, a second frame member and a third frame member connectable to one another to define the opening, and wherein the second member is rotatably coupled to the third frame member and adapted to rotate to operate the frame between the open and closed configurations.

17. A support assembly for supporting hydraulic lines, comprising:

plurality of rings fixedly mountable around respective hydraulic lines, each of the rings having a pair of complementary components that are removably connected together about a corresponding hydraulic line, each of the rings having internal surfaces comprising a pair of protrusions spaced apart along a longitudinal axis of the ring and extending inwardly for contacting and securing the hydraulic line relative to the corresponding ring, each of the rings further having external surfaces;

a frame having a first frame member, a second frame member and a third frame member connectable to one another to define an opening adapted to receive the rings, the first, second, and third frame members having cooperative surfaces facing the opening and configured to cooperate with the external surfaces of the rings when the rings are mounted within the opening to:

retain the rings within the opening and secured in an axial direction; and permit rotation of the rings about the axial direction in response to torsional forces exerted on the hydraulic, the first frame member being generally U-shaped, the second frame member is removably connected to opposite ends of the first frame member and is further rotatably coupled to the third frame member, wherein when the second frame member is disconnected from the first frame member, the second frame member is adapted to rotate about the third frame member between an open position allowing access to the opening for inserting the plurality of rings therein, and a closed position preventing access to the opening and securing the plurality of rings within the opening.

* * * * *